April 5, 1927.

M. A. BAKER

DRILLING APPARATUS

Filed Oct. 8, 1925

Inventor

Milo A. Baker.

By Lyon+Lyon

Attorneys

April 5, 1927.
M. A. BAKER
1,623,084
DRILLING APPARATUS
Filed Oct. 8, 1925    2 Sheets-Sheet 2
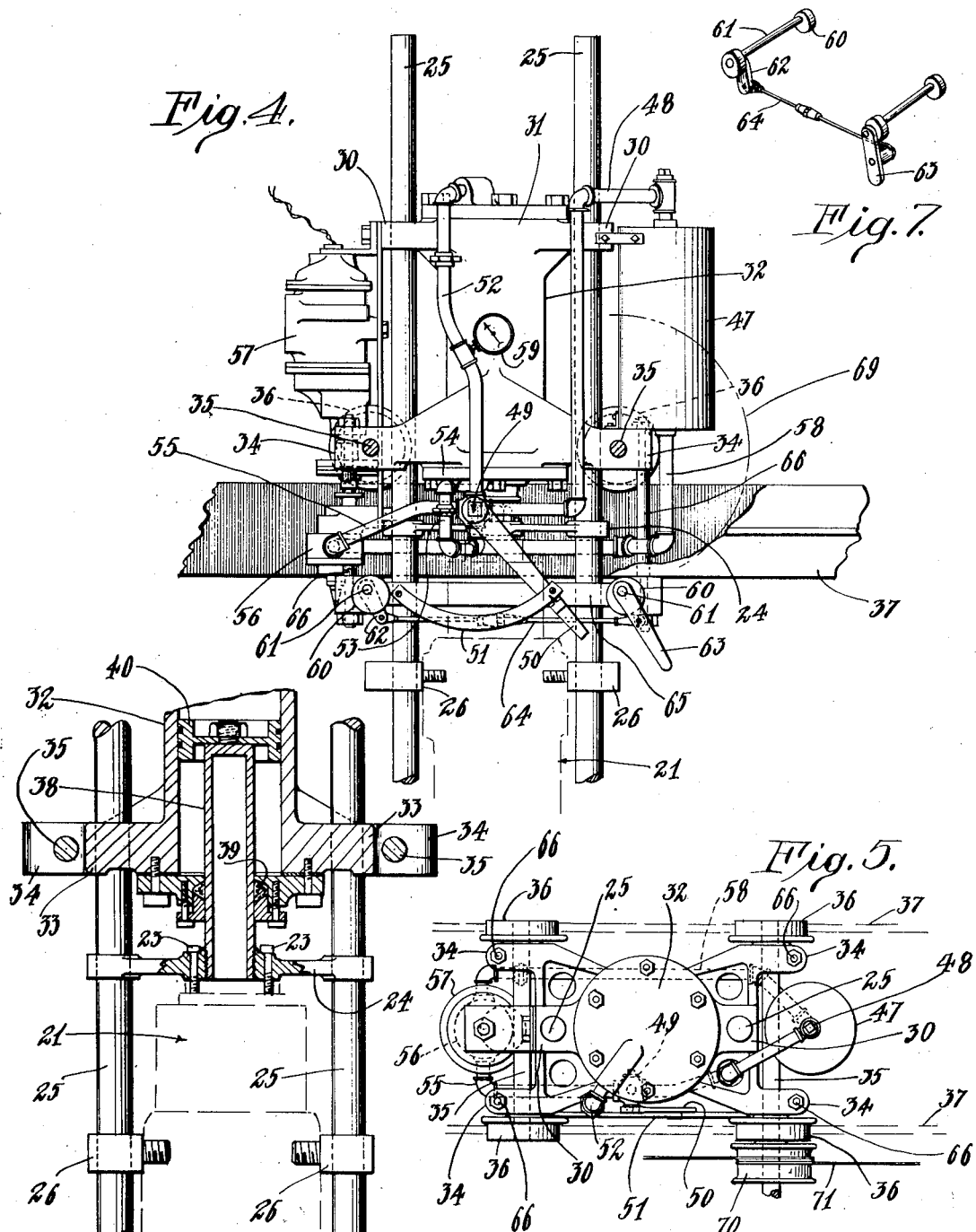
Inventor
Milo A. Baker,
By Lyon & Lyon
Attorneys Patented Apr. 5, 1927.

1,623,084

UNITED STATES PATENT OFFICE.

MILO A. BAKER, OF LOS ANGELES, CALIFORNIA.

DRILLING APPARATUS.

Application filed October 8, 1925. Serial No. 61,205.

This invention relates to electric drilling apparatus, and especially to that type in which the drill can be readily moved into different positions in a horizontal plane so as to quickly effect the drilling of a number of holes in different parts of the work. This drilling apparatus is especially useful in drilling holes in structural steel or iron elements for receiving the rivets employed in the fabricating of said elements.

The usual method employed in making the rivet holes in structural steel and iron is to punch said holes. When the holes are punched the rivets often do not entirely fill the holes, thus permitting a bending strain to come upon the rivets instead of a mere shearing. The rivets are much stronger in shear than in bending.

From the foregoing it follows that in order that drilling may be substituted for punching of the holes in structural steel elements, it is fundamental that the construction of the drilling apparatus must be such that the drill may be quickly raised and lowered and moved in a horizontal plane from one position to another.

Another object of the invention is to prevent rocking of the drill during the drilling operation.

A further object is to effect raising and lowering of the drill steel by a hydraulic device.

Another object is to mount the drill operating mechanism upon a track or boom that is pivotally supported at one end so that the drill may be carried in the clear over the work that is to be operated on.

Another object is to so construct the hydraulic device that the raising of the drill steel can be effected at a much higher speed than lowering of said drill so as to minimize the time employed in changing the drill from one position to another.

Other objects and advantages will appear in the subjoined detailed description.

The accompanying drawings illustrate the invention.

Fig. 4 is a side elevation of the mechanism that is supported by the track, a fragment of which is also shown.

Fig. 5 is a plan view of Fig. 4.

Fig. 6 is an enlarged detail, partly in vertical mid-section, of the hydraulic device for raising and lowering the drill.

Fig. 7 is a perspective view of the mechanism for preventing rocking of the drill on the track.

Figures 1, 2, 3:
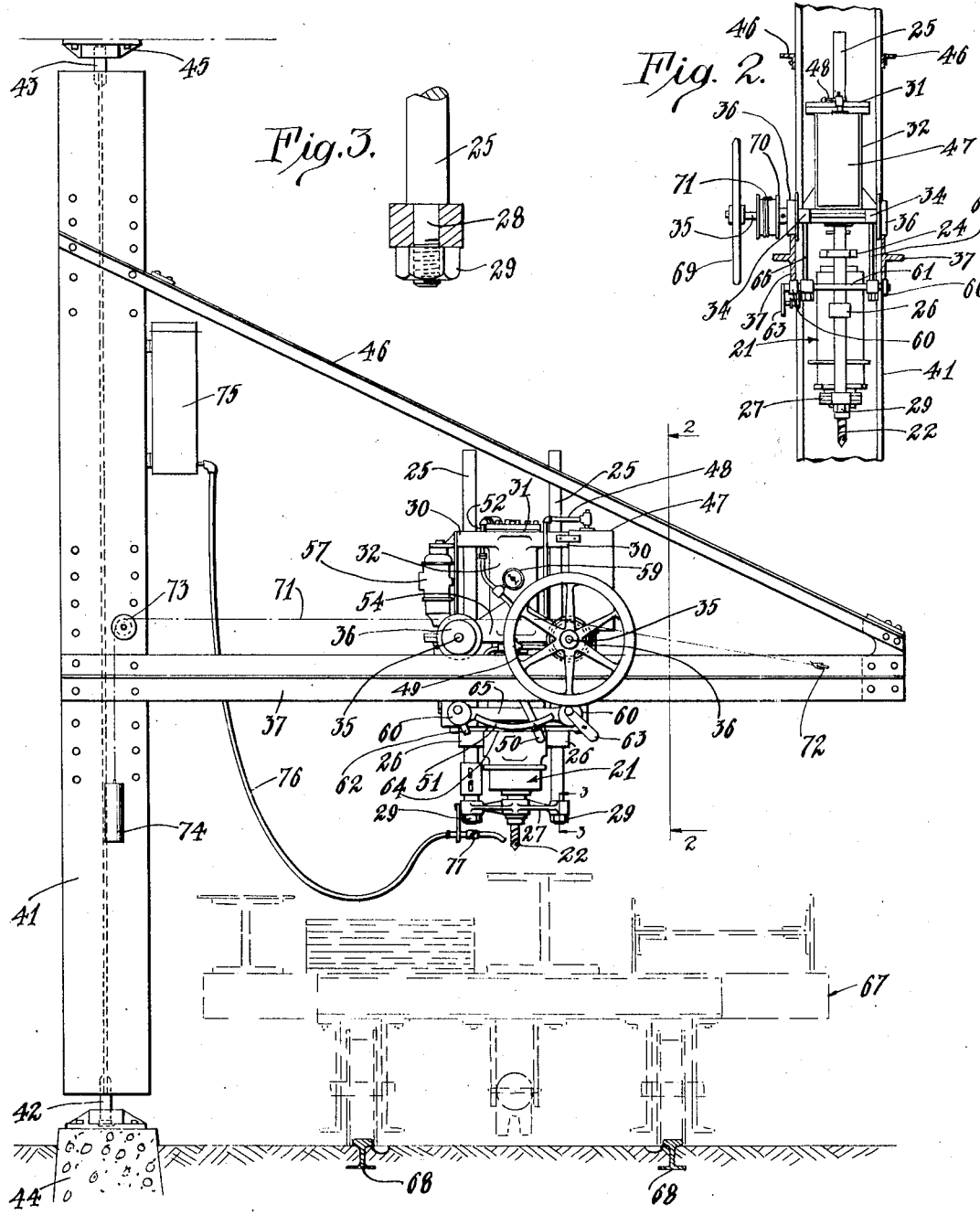
Fig. 1 is an elevation of a drilling apparatus constructed in accordance with the provisions of this invention, the work that is to be drilled being indicated in broken lines upon a work support.
Fig. 2 is a fragmental elevation, partly in section, from the line indicated by 2—2, Fig. 1.
Fig. 3 is an enlarged sectional detail on the line indicated by 3—3, Fig. 1.

Referring to the drawings, there is provided an electric drill 21 of any suitable construction, the drill steel operated by said electric drill being indicated at 22. The electric drill 21, as clearly shown in Fig. 6, is connected by bolts 23 to a cross head 24 which engages vertical guides 25. The cross head 24 is at the upper end of the drill 21 and, lower down, eyebolts 26, engaging the guides 25, are secured to the drill 21, in this instance being screwed into the casing of said drill. On the lower end of the drill 21 is secured a cross head 27, the ends of which engage reduced portions 28 of the guides 25 and nuts 29 secure the cross head 28 to said guides.

The guides 25 are slidably mounted in ears 30 projecting from the upper head 31 of a hydraulic cylinder 32. The guides 25 also slidably engage ears 33 that project laterally from the lower end of the cylinder 32. Projecting laterally from the lower end of the cylinder 32 are other ears 34, a pair at each side and extending through each pair of ears 34 is an axle 35. Each axle 35 is provided with flanged wheels 36 which run on a track 37 that, in this instance, is formed of parallel T-bars or rails.

One of the axles 35 is provided with a hand wheel 69 by which said axle and the wheels thereon are conveniently turned by the operator to cause translation of the cylinder. In some instances, to insure that the cylinder will move along the track even though slippage of the wheels 36 occur, it may be desirable to mount on the axle 35 having the hand wheel a pulley 70 and to wrap a cable 71 around said pulley and secure one end of the cable at 72 to the track. The other end of the cable 71 passes over a pulley 73 and is yieldingly held by suitable means as, for example, a weight 74. It will be readily understood that when the hand wheel 69 is turned, it effects turning of the pulley 70 so as to pull the cylinder along the track.

Suspended from the pivoting member 41 is a tank 75 for a cooling liquid for the drill, and leading from the tank is a tube 76 provided with a cock 77.

Screwed or otherwise fixed to the cross head 24 is a plunger rod 38 which passes through a stuffing box 39 and projects into the cylinder 32. The plunger rod 38 connects with a plunger 40 inside of the cylinder 32 and the outside diameter of the plunger rod 38 is preferably large relative to the inside diameter of the cylinder 32 so that the exposed area of the lower face of the plunger to be acted on by the hydraulic fluid will be materially less than the area of the upper face of the plunger. This insures that the rise of the plunger will be much quicker than the lowering thereof. It is clear that raising of the plunger will lift the drill and lowering of the plunger will lower said drill.

The tracks 37 constitute a boom that extends horizontally from and is fixed at one end to a pivoting upright 41, the pivots being indicated at 42, 43. The lower pivot 42 is supported by a suitable foundation 44 and the upper pivot 43 projects from a bracket 45 which is suitably fixed to an overhead structure, not shown.

The outer end of the track 37 is supported by tie members 46 which are secured to the pivoting member 41 above the junction of the track with said pivoting member.

It will now appear that the drill can be moved up and down relative to the work and toward and from the pivoting member 41 and also in an arc about the axis of said pivoting member.

To control the hydraulic fluid employed in the cylinder 32, I provide a reservoir 47 which has its upper end connected by a pipe 48 to a four-way valve 49 operated by a lever 50 which works along a quadrant 51. The four-way valve connects with a pipe 52 which communicates with the cylinder bore through the cylinder head 31 and said valve connects with a pipe 53 that communicates with the cylinder bore through the lower cylinder head 54. Also the four-way valve is connected by a pipe 55 to a suitable source of fluid pressure which, in this instance, is the outlet of a pump 56. The pump 56 is direct connected to an electric motor 57 which is suitably supported from the cylinder 32. The lower end of the reservoir 47 is connected by a pipe 58 to the intake of the pump 56.

When it is desired to lower the drill, the lever 50 will be moved to position the four-way valve so that fluid will be drawn from the reservoir 47 through the pipe 58 into the pump 56 and forced by said pump through the pipes 55, 52 into the upper end of the cylinder, thus forcing the plunger downwardly. This position of the four-way valve permits discharge of the oil from beneath the plunger through the pipe 48 to the reservoir. When it is desired to raise the drill, the lever 50 will be moved to position the four-way valve so that the oil will be drawn from the reservoir through the pipe 58 to the pump and forced by said pump through the pipes 55, 53 to the space beneath the plunger, thus forcing the plunger up. In this latter position of the four-way valve, it allows discharge of the oil from the space above the plunger into the pipe 48 and thence to the reservoir.

When it is desired to hold the drill in the position to which it has been adjusted vertically, the lever 50 will be moved to a neutral position to operate the four-way valve into position to close the pipes 52, 53. When the four-way valve is in the neutral position, the oil by-passes from the discharge to the suction side of the pump through a relief valve in the pump head in a manner well understood by those versed in the art relating to pumps. The relief valve maintains a constant pressure in the pipes and may be adjustable to obtain different pressures.

An important feature is the pressure gage 59 which is mounted on the pipe 52, and, since this pressure gage denotes the pressure of fluid in the pipe 52, it also denotes the fluid pressure above the plunger and, accordingly, the pressure that is being exerted by the drill steel upon the work, thus informing the operator so that he will feed the drill as rapidly as possible to the work without causing the drill steel to break.

In order to prevent rocking of the drill, I provide means connected with the cylinder 32 to engage the underface of the track 37. These means are preferably constructed as follows: Adapted to engage the underface of the track 37 are eccentrics 60 mounted in pairs on shafts 61. The shafts 61 are provided with operating arms 62, 63 respectively and a rod 64 connects the arms 62, 63 so that when the arm 63 is moved it accomplishes rotation of all of the eccentrics 60. The shafts 61 pass through horizontal supports 65 which are connected with the cylinder 32 by vertical members 66. This construction can be clearly seen in Fig. 2. When the member 63 is moved to one position it will cause the eccentrics 60 to bind upon the underface of the track 37 so as to securely lock the cylinder 32 and the parts connected with said cylinder against movement along the track. During some drilling operations such locking of the cylinder against movement may be desirable. In other instances it may not be necessary to lock the cylinder against movement of the track and the arm 63 will be positioned so that the eccentrics 60 will lie quite close, but not quite touch the underfaces of the rails 37 in order that when the drill is in operation on the work, the cylinder 32 cannot rock on the track. This is a further important feature of the invention as, heretofore, drills of this type have been operated upon only a single rail, the wheels engaging the lower flange of a T-beam on the opposite sides of the web of said beam, thus permitting lateral rocking of the drill.

The work that is to be drilled will preferably be mounted on a suitable carriage or truck 67 so that, not only can the drill be moved into different positions on a piece of work and from one piece of work to another, but the carriage may be shifted in order that the drill may be employed on those parts of the work that would be out of range if the work were not shifted relative to the boom.

In this instance the truck 67 is mounted on rails 68 which thus function as guides to guide it into position where the boom can be swung over it.

The invention operates as follows: Assuming that the motor 57 is operating, that the eccentrics 60 are released from the rails 37, that the lever 50 is in the neutral position, and that the truck 67 with the work thereon is adjacent to the pivoting member 41, the operator will swing the boom and operate the hand wheel 69 to effect movement of the drill 21 into position over the element that is to be drilled. With one hand grasping the hand wheel 69, the operator with his other hand will operate the lever 50 to position to pump the oil into the upper end of the cylinder, thus driving the plunger and the drill downward. As the drill steel approaches the work, the operator, if necessary to accurately center the drill steel on the spot to be drilled, will swing the boom and operate the hand wheel. As the drill steel engages the metal and drills it, the operator watches the gage 59 and correctly operates the lever 50 to feed the drill steel with the right amount of pressure to effect the drilling speedily without breaking the drill steel.

If extreme accuracy of the drilling is required, the operator, as soon as the drill steel engages the work, will throw the lever 63 to lock the cylinder against movement on the track while the drilling is being completed. When the drill steel has penetrated to the desired depth, the operator will operate the lever 50 to position to pump the oil into the lower end of the cylinder and allow the oil to discharge from the upper end of said cylinder, thus raising the plunger and the drill.

As soon as the drill steel disengages the work, the operator will throw the lever 50 to neutral position to hold the drill steel at such elevation, while he quickly moves the drill into position for drilling another hole by either swinging the boom or turning the hand wheel 69 or making both these operations. When the drill steel is again correctly positioned, the operator will proceed as before to effect the drilling, and so on until the desired number of holes have been drilled.

I claim:

1. A drilling apparatus comprising spaced rails, a pair of wheels on each rail, a cylinder mounted on the wheels, a plunger in the cylinder, an electrically operated drill connected with the plunger, means to admit an operating fluid to the cylinder and an electrically operated pump mounted on the cylinder operable to impart pressure to the operating fluid.

2. A drilling apparatus comprising spaced rails, wheels on the rails, a cylinder mounted on the rails, a plunger in the cylinder, an electrically operated drill connected with the plunger, means to admit an operating fluid to the cylinder on either side of the plunger, guides slidably connected with the cylinder, an upper crosshead connected at its ends to the guides and at its middle to the drill, a lower cross head connected at its ends to the guides and at its middle portion to the drill, and means connected with the cylinder to engage the underface of the rails.

3. A drilling apparatus comprising a track, a cylinder mounted to shift along the track, a plunger in the cylinder, means to admit an operating fluid to the cylinder on either side of the plunger, guides slidably connected with the cylinder, an electrically operated drill connected with the plunger and with the guides, a reservoir mounted on the cylinder, an electric motor mounted on the cylinder, a pump driven by said motor, a four-way valve, pipes connecting the four-way valve with the opposite ends of the cylinder, a pipe connecting the pump inlet with the reservoir, a pipe connecting the pump outlet with the four-way valve, and a pipe connecting the four-way valve with the reservoir.

4. A drilling apparatus comprising a track, a cylinder mounted to shift along the track, a plunger in the cylinder, a stuffing box at the lower end of the cylinder, a plunger rod passing through the stuffing box and attached to the plunger, said plunger rod being of large diameter relative to the inside diameter of the cylinder so that the exposed area of the lower face of the plunger will be materially less than the area of the upper face of the plunger to accelerate the upward movement of the plunger, an electric drill connected with the plunger rod, means to admit an operating fluid to the cylinder on either side of the plunger, and an electrically driven pump to impart pressure to the operating fluid.

5. A drilling apparatus comprising a track, wheels on the track, a hand wheel connected with one of the wheels to turn it, a cylinder mounted on the first mentioned wheels, a plunger in the cylinder, an electric drill connected with the plunger, means to admit an operating fluid to the cylinder on either side of the plunger, a pulley operably connected with the hand wheel, a cable wrapped around the pulley and connected at one end with the track, and means yieldingly connected with the other end of the cable.

6. A drilling apparatus comprising a track, wheels on the track, a cylinder mounted on the wheels, a plunger in the cylinder, guides shiftably engaging the cylinder, a rod connected with the plunger, a cross head secured to the plunger rod and having its ends engaging the guides, an electric drill connected with the cross head, a second cross head secured to the drill and having its ends secured to the guides, and means to admit an operating fluid to the cylinder on either side of the plunger.

7. A drilling apparatus comprising a track formed of spaced rails, a cylinder, ears projecting from the cylinder, axles extending through the ears, wheels on the axles engaging the rails, members projecting down from the ears, members connecting the lower ends of the last mentioned members, shafts supported by the second mentioned members, eccentrics on the shafts beneath the rails, operating arms on the shafts, means connecting the operating rods, a plunger in the cylinder, and means to admit an operating fluid to the cylinder on either side of the plunger.

8. A drilling apparatus comprising a cylinder, a support for the cylinder, a plunger in the cylinder, an electrically operated drill connected with the plunger, and means to admit the same operating fluid to the cylinder on either side of the plunger.

9. A drilling apparatus comprising a cylinder, a support for the cylinder, a plunger in the cylinder, an electrically operated drill connected with the plunger, means to admit an operating fluid to the cylinder on either side of the plunger, guides slidably connected with the cylinder, and upper and lower cross heads connected at their ends to the guides and at their middle portions to the drill.

10. A drilling apparatus comprising a cylinder, a support for the cylinder, a plunger in the cylinder, means to admit an operating fluid to the cylinder on either side of the plunger, guides slidably connected with the cylinder, an electrically operated drill connected with the plunger and with the guides, a reservoir mounted on the cylinder, an electric motor mounted on the cylinder, a pump driven by said motor, a four-way valve, pipes connecting the four-way valve with the opposite ends of the cylinder, a pipe connecting the pump inlet with the reservoir, a pipe connecting the pump outlet with the four-way valve, and a pipe connecting the four-way valve with the reservoir.

11. A drilling apparatus comprising a cylinder, a support for the cylinder, a plunger in the cylinder, a stuffing box at the lower end of the cylinder, a plunger rod passing through the stuffing box and attached to the plunger, said plunger rod being of large diameter relative to the inside diameter of the cylinder so that the exposed area of the lower face of the plunger will be materially less than the area of the upper face of the plunger to accelerate the upward movement of the plunger, an electric drill connected with the plunger rod, and means to admit the same operating fluid to the cylinder on either side of the plunger.

12. A drilling apparatus comprising a track, wheels on the track, a hand wheel connected with one of the wheels to turn it, drilling means mounted on the first mentioned wheels, a pulley operably connected with the hand wheel, a cable wrapped around the pulley and anchored at one end and extending parallel with the track, and means yieldingly connected with the other end of the cable.

13. A traversing apparatus comprising a track, wheels on the track, a hand wheel connected with one of the wheels to turn it, a pulley operably connected with the hand wheel, a cable wrapped around the pulley and anchored at one end and extending parallel with the track, and means yieldingly connected with the other end of the cable.

14. A drilling apparatus comprising spaced rails, a pair of wheels on each rail, a reservoir for an operating fluid mounted on the wheels, a cylinder mounted on the wheels, a plunger in the cylinder, an electrically operated pump mounted on the cylinder, means under the control of an operator to induct operating fluid from the pump to the cylinder alternately on opposite sides of the plunger and from the cylinder to the reservoir, and an electrically operated drill connected with the plunger.

Signed at Los Angeles, Calif., this 1st day of October, 1925.

MILO A. BAKER.